TEST CIRCUIT FOR EVALUATING MAGNETIC MEMORY DEVICES WHICH ENERGIZES THE DEVICES A PREDETERMINED NUMBER OF TIMES PRIOR TO TEST
Filed Aug. 26, 1964
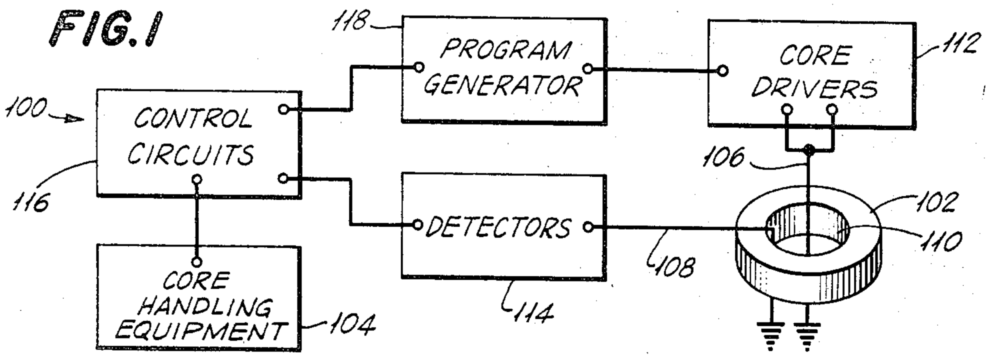
FIG. 1
FIG. 12
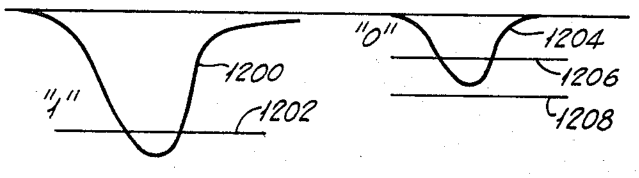
FIG. 13
| FLIP-FLOP | 0 | 1 | 2 | 3 | 4 | 5 | 6 | 7 | 8 |
|---|---|---|---|---|---|---|---|---|---|
| 941 | 1 | 1 | 0 | 1 | 0 | 1 | 0 | 1 | 0 |
| 942 | 1 | 1 | 1 | 0 | 0 | 1 | 1 | 0 | 0 |
| 943 | 1 | 1 | 1 | 1 | 1 | 0 | 0 | 0 | 0 |
| 944 | 0 | 1 | 1 | 1 | 1 | 1 | 1 | 1 | 1 |
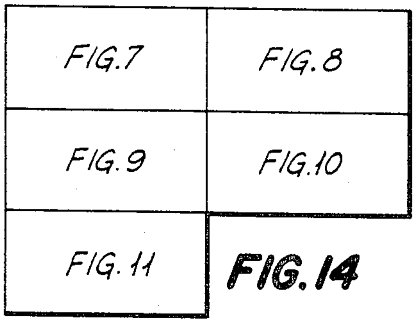
FIG. 14
INVENTOR
WILLIAM H. KASTNING
by Q. C. Schwarz, Jr.
ATTORNEY.

Sept. 24, 1968 W. H. KASTNING 3,403,331

TEST CIRCUIT FOR EVALUATING MAGNETIC MEMORY DEVICES WHICH ENERGIZES THE DEVICES A PREDETERMINED NUMBER OF TIMES PRIOR TO TEST

Filed Aug. 26, 1964 9 Sheets-Sheet 5

Sept. 24, 1968 W. H. KASTNING 3,403,331

TEST CIRCUIT FOR EVALUATING MAGNETIC MEMORY DEVICES WHICH ENERGIZES THE DEVICES A PREDETERMINED NUMBER OF TIMES PRIOR TO TEST

Filed Aug. 26, 1964 9 Sheets-Sheet 6

Sept. 24, 1968 W. H. KASTNING 3,403,331

TEST CIRCUIT FOR EVALUATING MAGNETIC MEMORY DEVICES WHICH ENERGIZES THE DEVICES A PREDETERMINED NUMBER OF TIMES PRIOR TO TEST

Filed Aug. 26, 1964 9 Sheets-Sheet 7

Sept. 24, 1968 W. H. KASTNING 3,403,331

TEST CIRCUIT FOR EVALUATING MAGNETIC MEMORY DEVICES WHICH ENERGIZES THE DEVICES A PREDETERMINED NUMBER OF TIMES PRIOR TO TEST

Filed Aug. 26, 1964 9 Sheets-Sheet 8

3,403,331

TEST CIRCUIT FOR EVALUATING MAGNETIC MEMORY DEVICES WHICH ENERGIZES THE DEVICES A PREDETERMINED NUMBER OF TIMES PRIOR TO TEST

William H. Kastning, Aurora, Ill., assignor to Western Electric Company, Incorporated, New York, N.Y., a corporation of New York Filed Aug. 26, 1964, Ser. No. 392,141
16 Claims. (Cl. 324—34)

ABSTRACT OF THE DISCLOSURE

A core testing apparatus in which cores are automatically fed to a test station and then to accept or reject stations in dependence on the results of the test performed at the test station. A testing circuit repeatedly places a core in a given state and enables a response detector to measure the response of the core only after the core has been placed in the given state a predetermined number of times greater than one. A bidirectional counter advanced in one direction for each core fed to the testing station and in an opposite direction for each core tested acceptable automatically arrests operation of the apparatus when a given number of cores are found defective. The counter can also check the actual feeding of cores to the testing station and disables the operation of the apparatus when the core feeding unit fails to deliver cores for test.

This invention relates to a magnetic testing apparatus and, more particularly, to an apparatus for automatically testing and evaluating magnetic cores or elements.

Magnetic elements, such as toroidal or multiaperture magnetic cores, provide relatively compact and economic means for storing data bits and for performing other logic operations in digital data handling systems. In some of the applications in which these elements are used, such as memory planes, a relatively large number of the cores are carried on a common support provided with a number of separate drive, bias, and sense windings. Because of the small size of the magnetic cores and the density of these cores on the supporting member, the formation of these windings frequently requires a considerable amount of manual labor, and a significant part of the cost of the completed unit represents labor. Thus, if a completed assembly is found to be defective after completion of the unit because of incorrect windings or poor core characteristics resulting from one of a number of causes, such as incorrect formulation of the magnetic material or cracked or broken core bodies, a substantial loss is incurred. This loss is aggravated because it is difficult and, in some instances, impossible to replace a defective core in a completely wired assembly. Accordingly, it would be desirable to fully evaluate each individual magnetic element prior to assembly as part of an operating circuit. Further, since the number of magnetic elements used in these assemblies is very large, the system and apparatus used to evaluate or check the magnetic elements should be fully automatic and designed for use in conjunction with automatic core handling equipment.

Accordingly, one object of the present invention is to provide a new and improved apparatus for testing and evaluating magnetic elements.

Another object is to provide an apparatus for automatically testing magnetic cores for and selecting magnetic cores on the basis of predetermined electrical and magnetic characteristics.

A further object is to provide a magnetic core or element testing apparatus including new and improved means for automatically feeding and placing test windings on the core in synchronism with the operation of a testing means that subjects each core to a predetermined sequence of tests.

Another object is to provide a magnetic core testing apparatus including new and improved means for automatically feeding a magnetic element to the testing apparatus and for checking the receipt of the element at the testing apparatus.

Another object is to provide a magnetic core testing apparatus including both counting means operated in accordance with the results obtained from testing a plurality of cores and means controlled by the counting means for arresting operation of the testing apparatus when an excessive number of cores is found to be defective.

A further object is to provide a core testing apparatus in which the core driver and sense units are sequentially coupled to the core in the selected time slots of a repetitive time frame under the control of the program generator and in which the operation of the program generator is synchronized with an apparatus for automatically feeding and selecting cores.

A further object is to provide a magnetic core testing apparatus in which a counter means for counting the number of cores automatically supplied to the testing apparatus by a a core handling apparatus is reset as each tested core is found to be satisfactory so as to provide an indication of the number of successively fed cores found to be defective.

In accordance with these and many other objects, an embodiment of the invention comprises an apparatus for automatically evaluating the electrical and magnetic characteristics of a magnetic element, such as a toroidal core. The apparatus includes an automatic core handling unit having a probe unit that transfers magnetic cores from a moving conveyor to a test station in which the probe unit completes drive and sense windings for testing the core. The probe unit is retracted after the core testing operation, and the released core is then selectively discharged to separate containers for collecting satisfactory and defective cores.

The testing and evaluating circuit includes a plurality of difference amplifiers or detectors coupled to the probe providing the sense winding for the core. The remaining probe provides a drive winding to which oppositely poled read and write pulses are supplied by core driver amplifiers. By establishing different sensitivities for the detectors coupled to the sense winding and by providing selected sequences and combinations of read and write signals to the core, the different characteristics of the cores, such as the "0" and "1" response, can be determined.

The performance of the sequence of tests on the core is controlled by a program generator forming a part of the testing and control circuits. This program generator provides a plurality of discrete signals in spaced time slots of a repetitive time frame, the duration and positions of which signals within the time slots can be adjusted. Signals appearing in different ones of the time slots are coupled to enabling gates for the core drivers and detectors to permit the desired sequence of test operations to be performed on the core in different slots of the time frame. As an example, the write current driver can be rendered effective to drive the core in a given time position, and the read current driver together with one or more of the detectors can be rendered effective in a subsequent time slot to evaluate the preceding write operation. The test program, once established is indefinitely repeated in a timed relation with the apparatus for automatically feeding, accepting, and rejecting the cores.

A counting means in the control circuit advanced a single step for each core fed to the testing station and reset for each core found to be satisfactory provides a continuous indication of the number of successive tested cores found to be defective. If this number exceeds a given value, the operation of the core testing system is arrested. The counting means can also be controlled to provide an indication of whether cores are being fed by the handling apparatus and to arrest operation of the system when more than a given number of core feeding operations do not result in the receipt of a core at the testing station.

Many other objects and advantages of the present invention will become apparent from considering the following detailed description in conjunction with the drawings in which:

FIG. 1 is a block diagram of a magnetic core testing and selecting apparatus embodying the present invention;

Figure 2A:
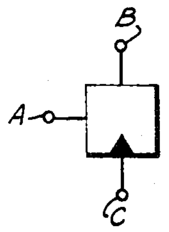
FIGS. 2–6 illustrate logic symbols and representative logic circuits used in the system.

FIGS. 7–11 form a complete logic diagram of a magnetic testing unit embodying the present invention;

FIG. 12 shows waveforms illustrating the core evaluating tests performed by the apparatus of the present invention;

FIG. 13 is a table illustrating the sequence of operations of a counting circuit included in the testing unit; and FIG. 14 is a block diagram illustrating the manner in which FIGS. 7–11 of the drawings are placed adjacent each other to form a complete logic diagram of the magnetic testing apparatus embodying the present invention.

Referring now more specifically to FIG. 1 of the drawings, therein is illustrated a block diagram of a magnetic core testing or evaluating system 100 which embodies the present invention and which is adapted to evaluate the electrical and magnetic characteristics of a magnetic core 102, such as a toroidal core, formed of ferrite material of any suitable composition. In the preferred embodiment of the invention, the system 100 includes an automatic core handling unit 104 comprising a core transporting turntable that is successively rotated or indexed from a feeding position in which successive cores are placed on the turntable to a testing position in which each core is removed by a probe unit. The probe unit carries the core to a testing station in which the probes are received in mating sockets to form a drive winding 106 and a sense winding 108 linking the core 102 and passing through a center opening 110 therein. The drive winding 108 is connected to a group of core drivers 112 including pulse sources supplying oppositely poled read and write signals. The sense winding 108 is coupled to the inputs of a plurality of detectors 114, the outputs of which are supplied to a control circuit 116.

The test or sequence of tests performed on the core 102 in the testing position is conjointly controlled by the control circuit 116 and a program generator 118. The program generator 118 provides enabling or control signals in a plurality of discrete time slots in a recurring or repetitive time frame, and the control signals can be adjusted to occupy different positions within the time slots and to have different widths. Selected combinations of the control signals are supplied from the program generator 118 to the core drivers 112 to provide write and read pulses to the core 102 in any desired sequence. The plurality of detectors 114 also are supplied with selected combinations of the control signals from the program generator 118 to render these detectors responsive to signals developed in the sense winding 108 in selected time slots.

The core testing apparatus or system 100 is capable of performing a number of different individual tests or sequences of tests on the cores 102. As an example, one set of tests consists of determining whether a "1" stored in the core 102 produces an output or response signal having an amplitude greater than a given value and of determining whether a "0" produces an output signal having an amplitude greater than a given value but less than another value. When this test is to be performed, one of the plurality of detectors 114 is provided with a reference potential corresponding to the low limiting value for the "1," and an additional pair of the detectors 114 are provided with reference potentials representing the high and low limiting values for the "0" response signal. To carry out this testing program, signals from the program generator 118 are supplied to the core drivers 112 to first write a "1" in the core 102 in one or a given group of time slots and then to supply a read signal in a subsequent time slot. The program generator 118 also enables the "1" evaluating detector in the group of detectors 114 in the same time slot as a selected one of the read pulses so that this detector response to the voltage induced in the sense winding 108. The control circuit 116 is provided with indications from the "1" evaluating detector 114 indicating the satisfactory or unsatisfactory completion of the test on the minimum amplitude of the "1" response voltage.

The program generator 118 also supplies signals to the core drivers 112 in subsequent time slots to repeatedly write a "0" in the core 102 and to read the previously stored "0." The two "0" evaluating detectors are enabled by the program generator 118 in a selected time slot so that the output signal developed in the sense winding 108 is compared against the high and low limits in the two "0" evaluating detectors 114. The results of this test are also supplied to the control circuit 116. At the completion of the time frame in which the "0" and "1" evaluation tests are performed, the control circuit 116 disables or momentarily inhibits further operation of the program generator 118.

At this time, the control circuit 116 determines whether both of the "1" and "0" evaluating tests on the cores 102 have been satisfactorily completed. If the tests have been satisfactorily completed, the circuit 116 opens a vacuum connection from the testing station to an accept core receiver. If the core is found to be defective, a vacuum line connection from the testing station to a reject core receiver remains open. Thus, when the core handling equipment 104 withdraws the probes, the previously tested core 102 is either displaced to the accept receiver or the reject receiver. The turntable then advances the next core 102 to be tested to the testing position, and the probe unit transfers this core to the testing station and completes the drive and sense windings. In this manner, successive cores 102 are automatically tested for proper magnetic and electrical operating characteristics and are separated into acceptable and unacceptable groups.

Since the testing of successive cores 102 proceeds automatically in the system 100, it is desirable to provide automatic means for determining a possible malfunction in the apparatus that would result in the rejection of an excessive number of cores. Accordingly, the control circuit 116 includes a counter that is advanced a single step in response to each core 102 fed to the testing station by the core handling equipment 104. This counter is reset to a normal condition each time that the control circuit 116 receives signals indicating the satisfactory completion of a test. Thus, the value standing in the counter at any given time represents the total number of successive cores fed to the testing station since the last time that a core was found to be acceptable. When this number exceeds a given value, a major alarm is sounded, and the system 100 is disabled. This permits the test operator to determine whether the large number of successively rejected cores is due to defects in the cores or an improper operation of the testing system 100. This counting means can also be used to check the feeding of the cores 102 by the equipment 104 by selectively resetting the counting means only when a core 102 is actually received at the testing station incident to a feeding cycle of the unit 104. This use of the counting means permits the system 100 to be placed in an alarm condition whenever the handling means 104 fails to provide cores 102 for testing.

The details of the magnetic core testing system 100 shown in block form in FIG. 1 are illustrated in FIGS.

7–13 of the drawings by the use of logic diagrams in which the various circuit components are shown in logic schematic form. In the logic diagrams, each circuit component, such as an inverter, is represented by a particular logic symbol. The logic symbols for certain of the circuit components together with typical circuit arrangements represented by the symbols are illustrated in FIGS. 2–6 of the drawings. Each of these figures includes both an illustration of the logic symbol and a typical circuit represented by the symbol. Although the illustrated representative circuits are conventional in design, a brief description of these circuits is set forth below.

Figure 2B:
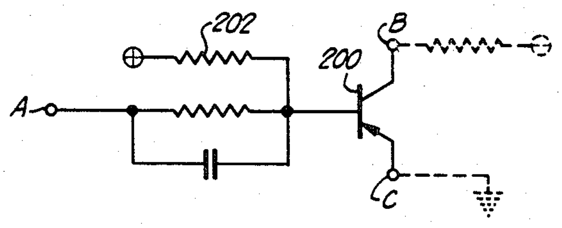

The logic symbol for an inverter is illustrated in FIG. 2A, and a typical circuit for this inverter is illustrated in FIG. 2B. The circuit includes a transistor 200 whose collector electrode is connected to a terminal B and whose emitter electrode is connected to a terminal C. In circuit applications, the terminal B is normally connected to a nominal negative potential of fifteen volts through a load, such as a resistance element shown in dashed outline in FIG. 2B. If desired, the external load connected to the terminal B can include a clamping diode returned to a negative reference potential such as three volts. The emitter electrode is normally returned to a more positive potential, such as ground, as shown in dashed line. In some applications, the terminals B and C of several inverters are connected in series between ground and the negative potential to provide a NAND gate. The base of the electrode is connected to a positive biasing potential through a resistance element 202 that normally maintains the transistor 200 in a nonconductive condition. The base of the electrode is also coupled to an input terminal A. In the rectangle forming the inverter logic symbol shown in FIG. 2A, the terminal C connected to the emitter of the transistor 200 is indicated by a darkened triangle and is always disposed in alignment with an output lead extending to the collector terminal B. The lead to the base terminal B can appear on either side of the rectangle in the logic diagram.

Figures 3A, 3B:
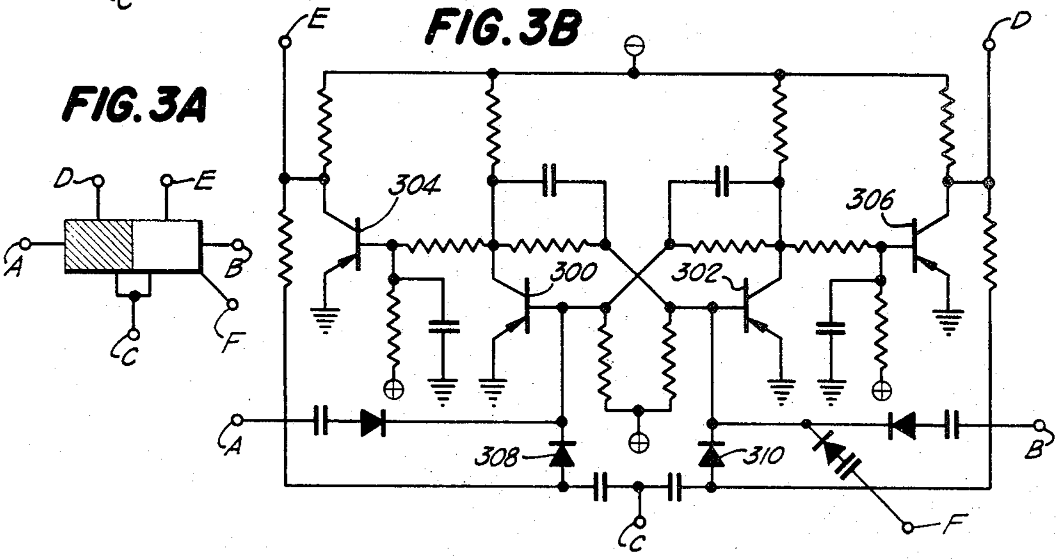

The logic symbol for a representative flip-flop is shown in FIG. 3A, and a typical circuit represented by this symbol is shown in FIG. 3B. The flip-flop includes a pair of cross-coupled transistors 300 and 302 forming a bistable circuit and a pair of output transistors 304 and 306. In the reset condition of the circuit representing a binary "0," the output transistor 306 and the flip-flop transistor 300 are in a conductive condition. The remaining two transistors 302 and 304 are in a nonconductive condition. This means that when the flip-flop is in a reset or "0" representing condition, the conductive transistor 306 applies a more positive potential to an output terminal D, and a more negative potential is supplied to an output terminal E. The ground potential applied to the terminal D is represented by the shaded portion of the rectangle forming the logic symbol shown in FIG. 3A, and the negative potential applied to the output terminal E is represented by the open section of this rectangle. In the logic diagram, the logic symbol for the flip-flop can appear in reversed or inverted position.

When the flip-flop is to be set, a positive-going signal is applied to an input terminal A and is coupled through a diode to the base of the transistor 300. This places its base at a positive potential with respect to its emitter and places this transistor in a nonconductive condition. When the transistor 300 is placed in a nonconductive condition, the potential applied to the base of the transistor 302 is driven in a negative direction to place this transistor in a conductive state. The shift in the conductive states of the two transistors 300 and 302 places the transistor 306 in a nonconductive condition and places the transistor 304 in a conductive condition. When the transistor 306 is in a nonconductive condition, the potential of the output terminal D drops to a more negative potential, and the potential at the output terminal E rises to a more positive potential when the transistor 304 is placed in conduction. The flip-flop can be restored to its reset or "0" representing condition by the application of a positive-going signal to either of a pair of input terminals B and F. A complementing input terminal C is coupled to the base electrodes of both of the transistors 300 and 302 through a pair of diodes 308 and 310 so that the application of a positive-going pulse to this terminal shifts the flip-flop from its existing state to its alternate stable state.

Figure 4B:
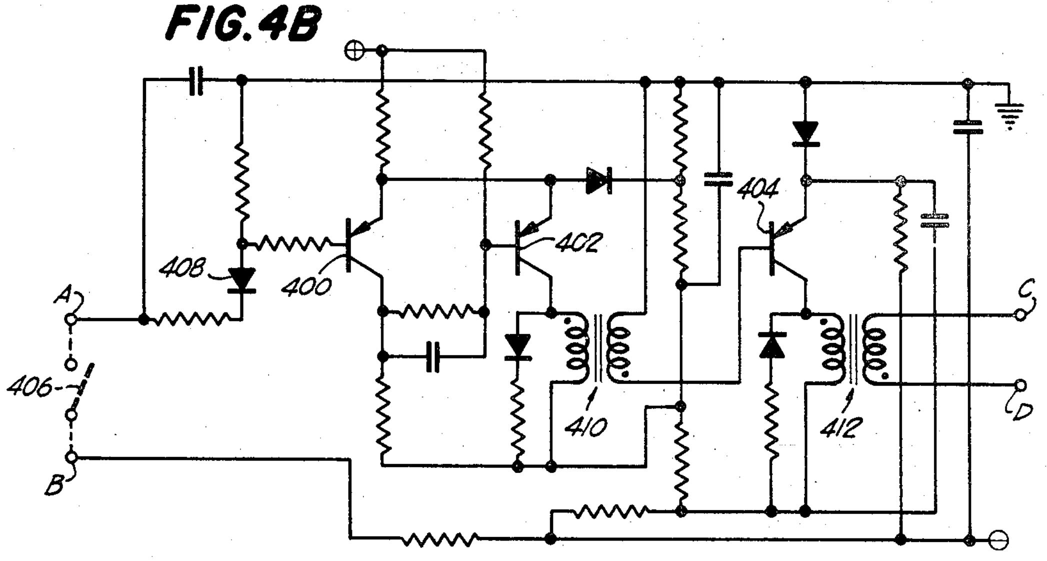
Figure 4A:
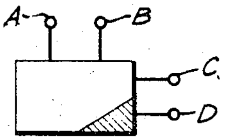

FIG. 4A of the drawings illustrates a logic symbol for a pulse generator, and FIG. 4B illustrates a circuit diagram for a typical pulse generator represented by the logic symbol. In general, when a pair of terminals A and B are momentarily connected together, the pulse generator supplies a negative-going pulse to an output terminal C or a positive-going pulse to an output terminal D.

Referring more specifically to the circuit diagram shown in FIG. 4B, the pulse generator includes three transistors 400, 402 and 404 of which only the transistor 402 is in a conductive state in the normal condition of the pulse generator. When the input terminals A and B are connected together, as by the closure of a switch 406, a more negative potential is forwarded through a diode 408 to the base of the transistor 400 to place this transistor in conduction. When the transistor 400 is placed in a conductive state, a more positive potential is applied to the base of the transistor 402 to place this transistor in a nonconductive state.

When the transistor 402 is placed in a nonconductive state, the termination of the current flow through the primary winding of a transformer 410 induces a negative-going pulse in a secondary winding which is applied to the base of the normally nonconductive transistor 404. This places the transistor 404 in conduction so that current flows through the primary winding of a pulse transformer 412. Since the base of the transistor 404 receives only a momentary pulse from the pulse transformer 410, it returns to a nonconductive state and terminates the flow of current through the primary winding of the pulse transformer 412. If the output terminal C is grounded, the current flow through the primary winding of the pulse transformer 412 when the transistor 404 is placed in conduction provides a positive-going pulse at the output terminal D. Alternatively, if the output terminal D is grounded or connected to a source of reference potential, the flow of current through the primary winding of the pulse transformer 412 provides a negative-going pulse at the output terminal C. Oppositely poled pulses are produced at the terminals C and D due to the collapse of the primary field of the transformer 412 when the transistor 404 returns to a nonconductive state. The transistors 400 and 402 return to normal conditions of conduction when the switch 406 is opened.

Figures 5A, 5B:
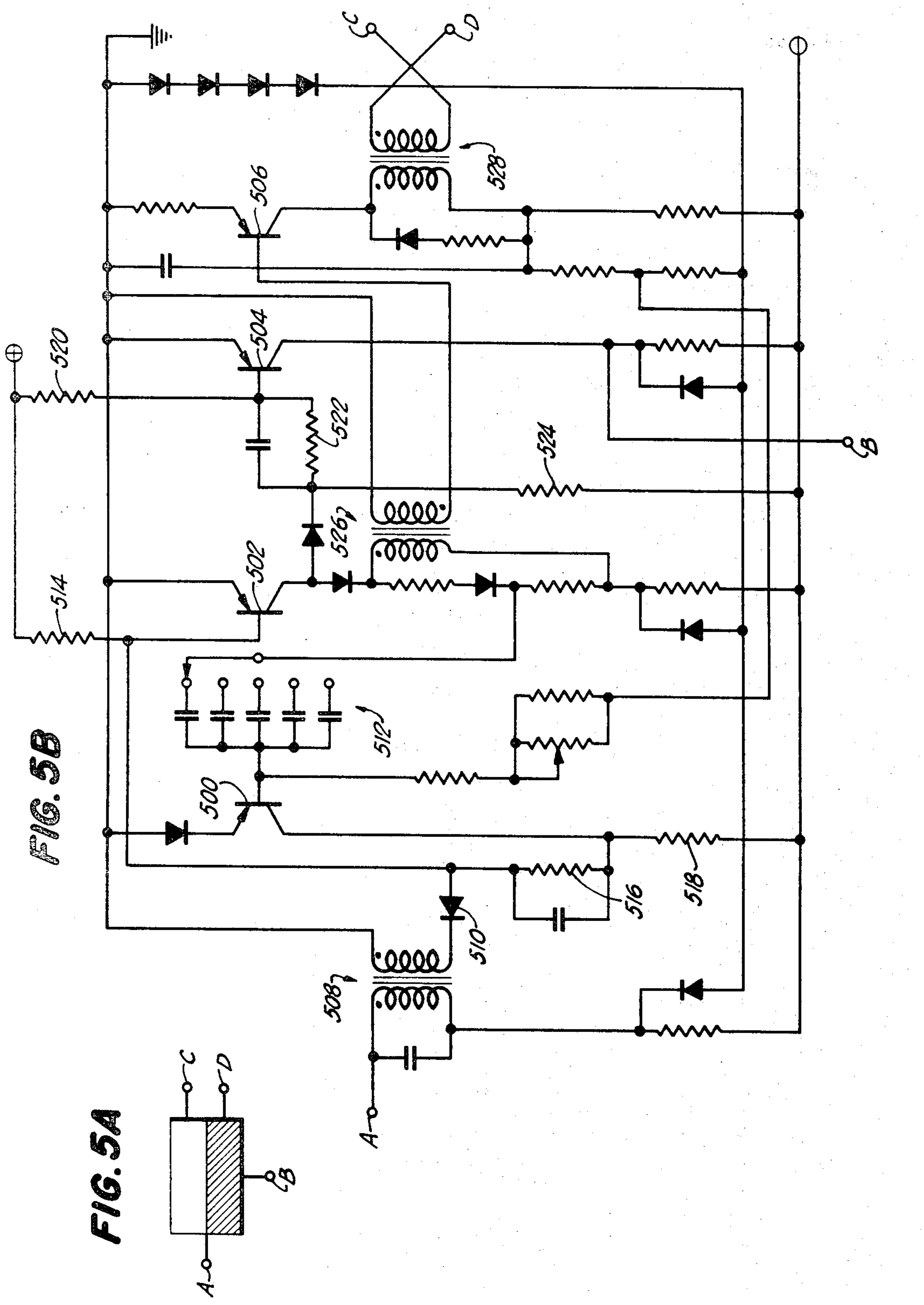

FIG. 5A of the drawings illustrates a logic symbol for a monostable circuit or delay circuit, and a typical circuit corresponding to this symbol is illustrated in FIG. 5B. In general, the monostable circuit is controlled by an input signal applied to an input terminal A to produce a steady state negative output signal at an output terminal B for a selected period of time. The duration of the negative-going output signal at the terminal B is independent of the duration of the signal applied to the input terminal A. This circuit also supplies either a positive-going pulse at a terminal D or a negative-going pulse at a terminal C at the termination of the delay interval.

Referring now more specifically to the monostable circuit shown in FIG. 5B, this circuit includes four transistors 500, 502, 504 and 506, two of which, 500 and 504, are normally in a conductive condition. The conductive transistor 504 normally maintains a more positive or potential approaching ground at the output terminal B as indicated by the shading in the lower portion of the rectangle forming the logic symbol illustrated in FIG. 5A. When a negative-going signal is applied to the terminal A, a pulse transformer 508 couples the negative-going signal through a diode 510 to the base of the transistor 502 to bias this base negative relative to its grounded emitter. This places the transistor 502 in conduction so that a positive-going pulse is coupled through a selected one of a plurality of timing condensers 512 to the base of the conductive transistor 500. This places the transistor 500 in a nonconductive condition. When the transistor 500 is placed in a nonconductive condition, a voltage divider including a plurality of resistance elements 514, 516 and 518 applies a steady state negative potential to the base of the transistor 502 to hold this transistor in a conductive condition.

When the transistor 502 is placed in a conductive condition, an intermediate point on a voltage divider including a plurality of resistance elements 520, 522 and 524 is returned to ground potential, and a more positive potential is applied to the base of the normally conductive transistor 504 so that this transistor is placed in a nonconductive condition. This places a negative potential on the output terminal B. The conductive transistor 502 also pulses the primary winding of a transformer 526. However, the polarity of the output pulse developed in the secondary winding of this transformer biases the base of the normally nonconductive transistor 506 in a positive direction and does not change the nonconductive state thereof.

The delay of the monostable circuit is determined by the selection of one of the plurality of capacitors 512 and the resistance of the elements connected to the base of the transistor 500. After a delay interval determined by the RC time constant of these components, the base of the transistor 500 drops to a negative potential relative to its emitter, and this transistor is placed in a conductive condition. When the transistor 500 is placed in a conductive condition, the negative potential is removed from the base of the transistor 502, and this transistor returns to a nonconductive state so that the base of the transistor 504 is driven in a negative direction relation to its emitter to place this transistor in a conductive condition. This terminates the application of the negative potential to the output terminal B.

In addition, the termination of current flow through the transistor 502 is effective through the pulse transformer 526 to couple a momentary negative-going pulse to the base of the transistor 506. This places this transistor in a conductive condition so that current flows through the primary winding of a pulse transformer 528. If the output terminal D is grounded, the flow of current through the primary winding of the pulse transformer 528 produces a negative-going pulse at the output terminal C. Alternatively, if the output terminal C is grounded or connected to a reference potential, the secondary winding of the transformer 528 produces a positive-going pulse at the output terminal D.

Thus, the monostable circuit provides a negative-going signal at the output terminal B persisting for the duration of the time delay of the monostable circuit, and the terminals C and D selectively provide oppositely poled pulses at the end of this delay interval. In the logic diagram, only the terminals of the logic symbol that provide output signals that are used are shown.

Figures 6A, 6B:
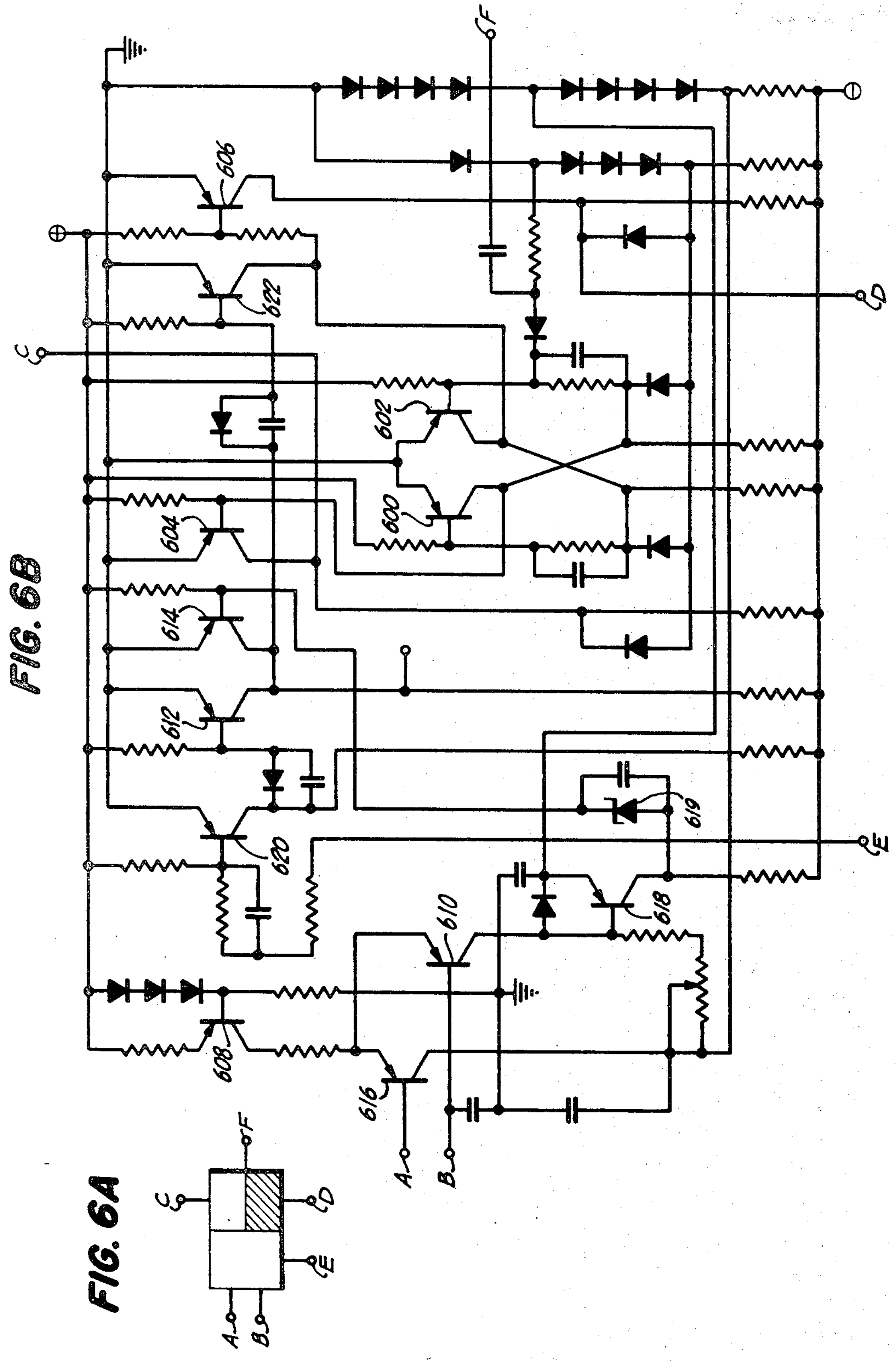
Figure 7:
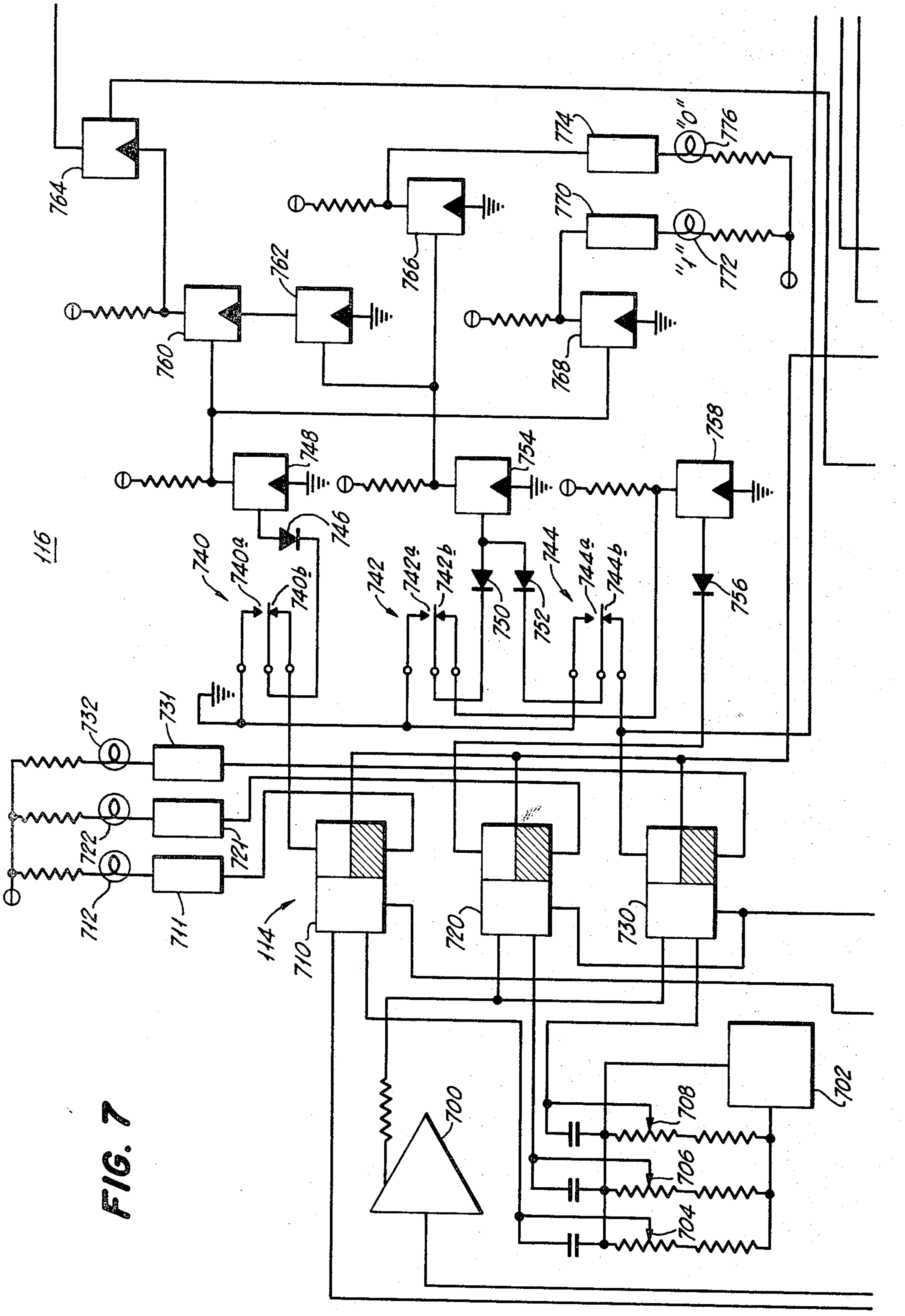
Figure 8:
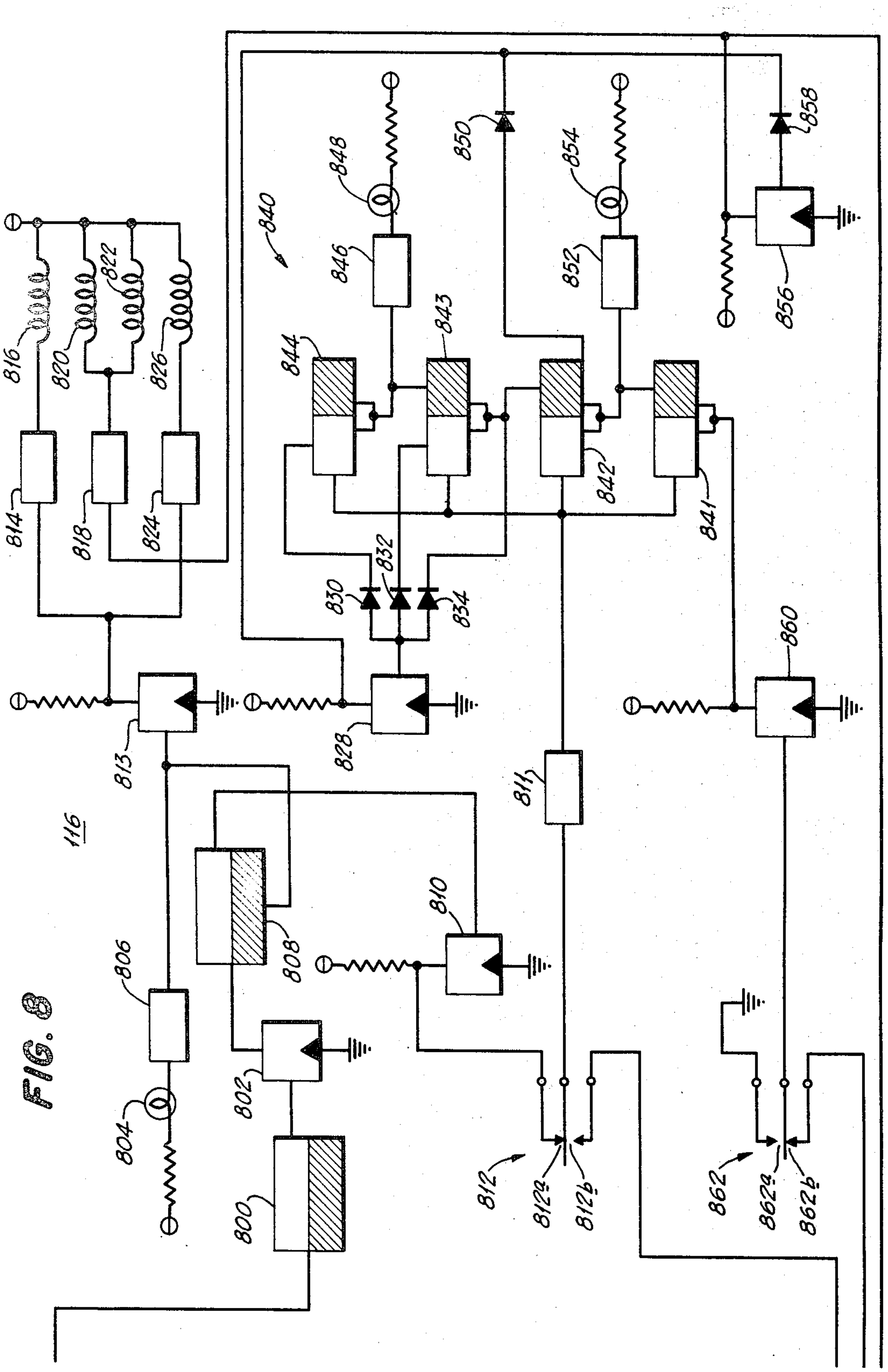
Figure 9:
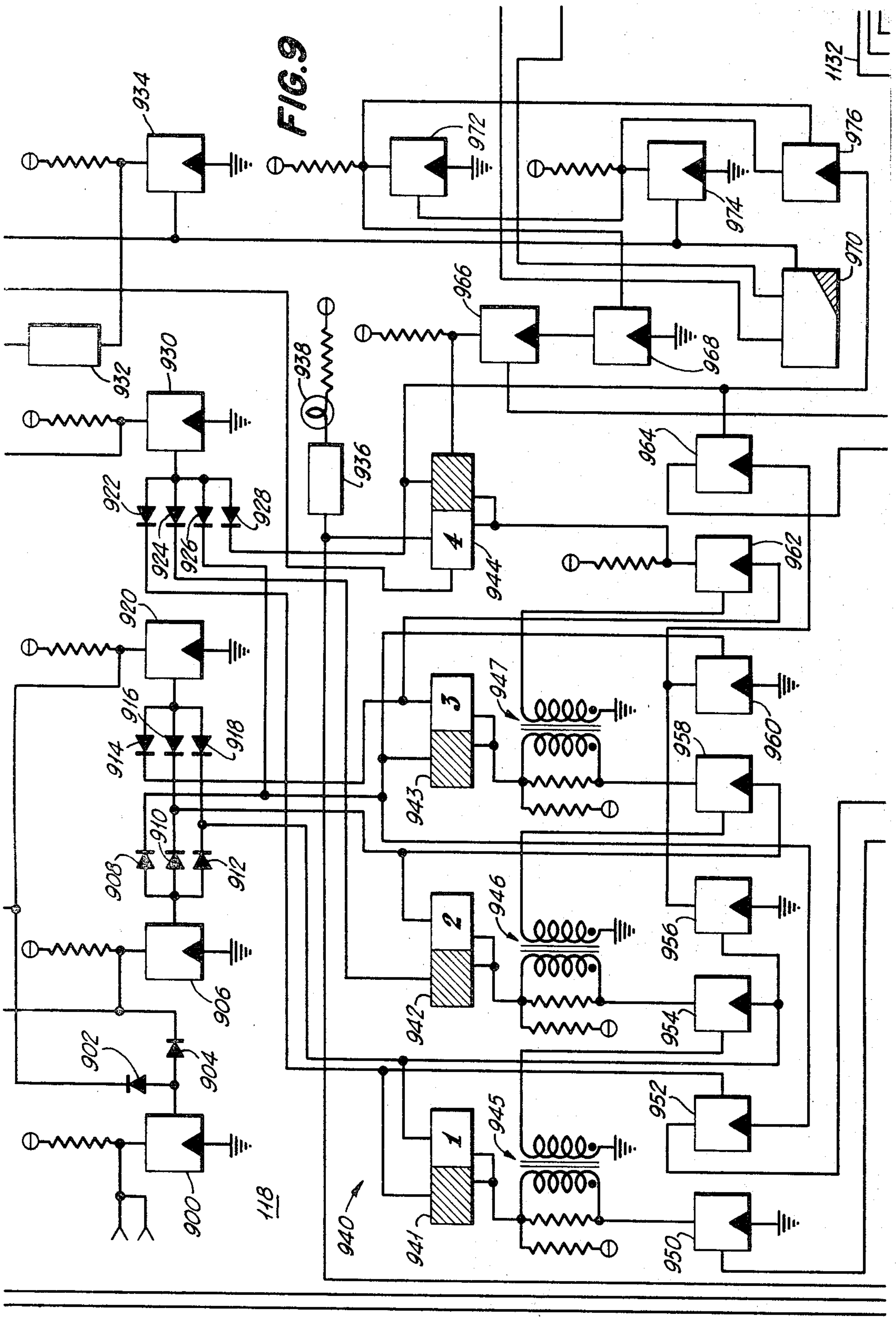

FIG. 6A of the drawings illustrates a logic symbol for a detector unit or slicer flip-flop, and FIG. 6B illustrates a representative circuit corresponding to this symbol. In general, the detector unit comprises a difference amplifier having a gate or strobe input for selectively setting a storage flip-flop in dependence on the relation between the values of an unknown input signal and a reference potential.

In the representative circuit shown in FIG. 6B, a pair of transistors 600 and 602 are cross-coupled to provide a bistable or flip-flop circuit in which the transistor 602 is reset to a normal nonconductive condition by the application of a positive-going pulse to a reset terminal F. In this condition, a first output transistor 604 is in a nonconductive condition to apply a negative potential to an output terminal C, and a second output transistor 606 is normally in a conductive condition to apply a more positive output signal to a terminal D. These normal output potentials are represented by the shaded and open right-hand portions of the block forming the logic symbol illustrated in FIG. 6A. In the normal condition of the circuit, a plurality of additional transistors 608, 610, 614, 616 and 618 are in a conductive condition. The transistor 608 provides a constant current source for the conductive transistors 610 and 616.

A negative reference potential establishing one operating parameter for the difference amplifier portion of the circuit is applied to an input terminal B, and the unknown input potential is applied to a terminal A. As the input signal applied to the terminal A becomes more negative than the reference potential applied to the terminal B, the conduction through the transistor 616 increases and the conduction through the transistor 610 decreases. If this unbalance persists for a time-voltage product on the order of 50 milli-nanoseconds, for example an unbalance voltage of five millivolts persisting for ten nanoseconds, the base of the transistor 618 is driven more negative so that conduction through this transistor increases. This increased conductivity drives a Zener diode 619 to apply a positive-going pulse to the base of the transistor 614.

The positive-going pulse applied to the base of the transistor 614 terminates conduction through this transistor. The change in conduction through the transistor 614 is not effective to change the setting of the storage flip-flop unless and until such time as the detector unit is enabled or strobed. This permits the value of the unknown potential applied to the input terminal A to be determined at a particular point in a time cycle.

More specifically, when the relative values of the potentials applied to the terminals A and B are to be evaluated or compared, a negative-going pulse is applied to a strobe input terminal E. This places the transistor 620 in a conductive condition so that the base of the transistor 612 is driven positively with respect to its emitter. This terminates conduction through this transistor and removes the clamp on the transistor 614. The conduction through this transistor is terminated in the manner described above when the magnitude of the voltage applied to the terminal A exceeds, in a negative direction, the level set by the reference potential applied to the terminal B.

The termination of conduction through both the transistors 612 and 614 applies a more negative potential to the base of a transistor 622. This places this transistor in conduction so that the transistor 602 is placed in a conductive condition and the transistor 600 is placed in a nonconductive state. The change in the conductive state of the transistor 600 applies a more negative potential to the base of the transistor 604 so that the potential applied to the output terminal C rises to a more positive value. The conduction through the transistors 602 and 622 biases the base of the transistor 606 positive with respect to its emitter so that conduction through this transistor is terminated. This applies a more negative potential to the output terminal D. Thus, in response to the receipt of a signal at the input terminal A exceeding the present level, the conductive state of the storage flip-flop including the transistors 600 and 602 is reversed, and the potentials applied to the output terminals C and D are reversed in accordance therewith.

When the negative enabling pulse is removed from the strobe terminal E, the transistor 620 returns to a nonconductive state, and the transistor 612 returns to a conductive state. This, in turn, returns the transistor 622 to a nonconductive state. The setting of the flip-flop including the transistors 600 and 602 is not changed. Since the transistor 602 remains in a conductive state, the transistor 606 remains in a nonconductive state. When the potential applied to the input terminal A drops below the preset level, the transistors 610, 614, 616 and 618 return to their normal states. The storage flip-flop is reset or cleared by the application of a positive-going pulse to the reset terminal F. When the flip-flop is reset to a condition in which the transistor 600 is in a conductive state and the transistor 602 is in a nonconductive state, the transistor 604 returns to a nonconductive state, and the transistor 606 returns to a conductive state so that the output terminals C and D provide their normal output potentials.

Referring now more specifically to FIGS. 7–11 of the drawings, therein are illustrated the details of the system 100 in conjunction with a schematic illustration of the automatic core handling equipment 104 (FIG. 10) for automatically feeding the cores 102 to be tested to the testing station and for selectively establishing drive and sense windings 106 and 108 around the core 102 in testing position.

The automatic core handling equipment 104 comprises suitable core conveying means, such as a turntable 1000, that is selectively rotated or indexed about a shaft 1003 to transport cores from a feeding station (not shown) to a testing station indicated generally as 1002. The turntable 1000 is rotated by suitable drive means or motor 1004 selectively energized under the control of a switch 1006. The cores 102 to be tested are selectively fed from a bulk supply thereof by suitable means, such as a vibratory hopper driven by a motor 1007, to be disposed in spaced core supporting means on the turntable 1000 shown as a recess 1008. The turntable 1000 advances the cores 102 from the feeding station to the testing station 1002 in which the core to be tested occupies the position shown in dot-and-dash outline in FIG. 10.

In this position, the core 102 is aligned with a probing assembly indicated generally as 1010 which includes a reciprocating slide or element 1012 slidably mounted on a supporting housing 1014 and actuated in synchronism with the turntable 1000 by timing cams driven by the motor 1004. A dielectric supporting member 1016 is secured to the slide 1012 by a connecting rod 1018. The supporting member 1016 carries a probing unit that transfers the cores from the turntable 1000 to a testing position and concurrently establishes the sense and drive windings 106 and 108 for the core 102 under test. More specifically, this probing unit comprises a generally U-shaped assembly having its bight portion secured to the supporting member 1016 and having two generally parallel extending legs spaced apart a distance sufficient to receive one leg of the core 102. This U-shaped assembly includes an inner U-shaped electrically conductive 1020 and an outer U-shaped and electrically conductive element 1022 between which is interposed a U-shaped dielectric or insulating layer 1024.

Figure 10:
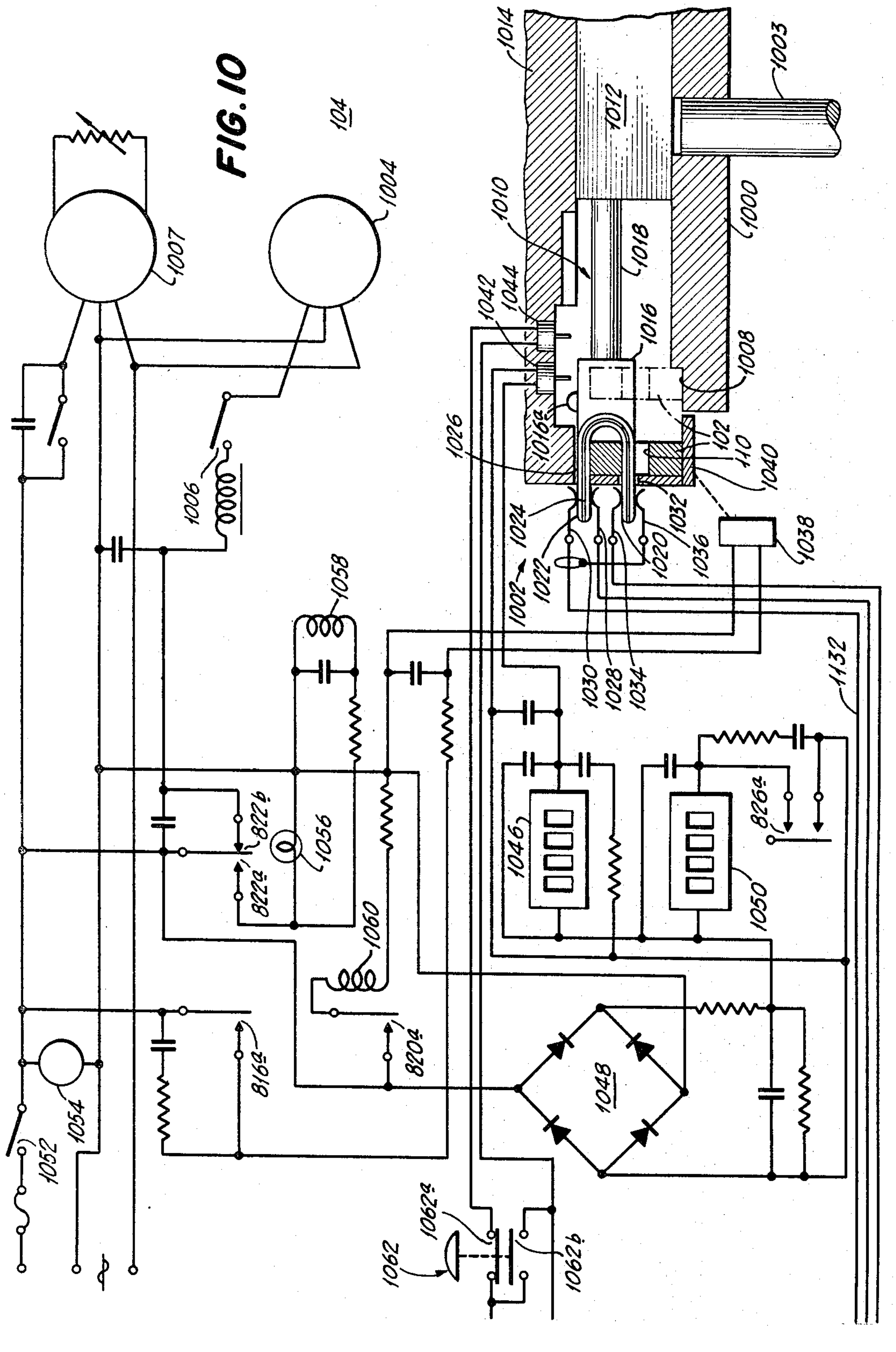
Figure 11:
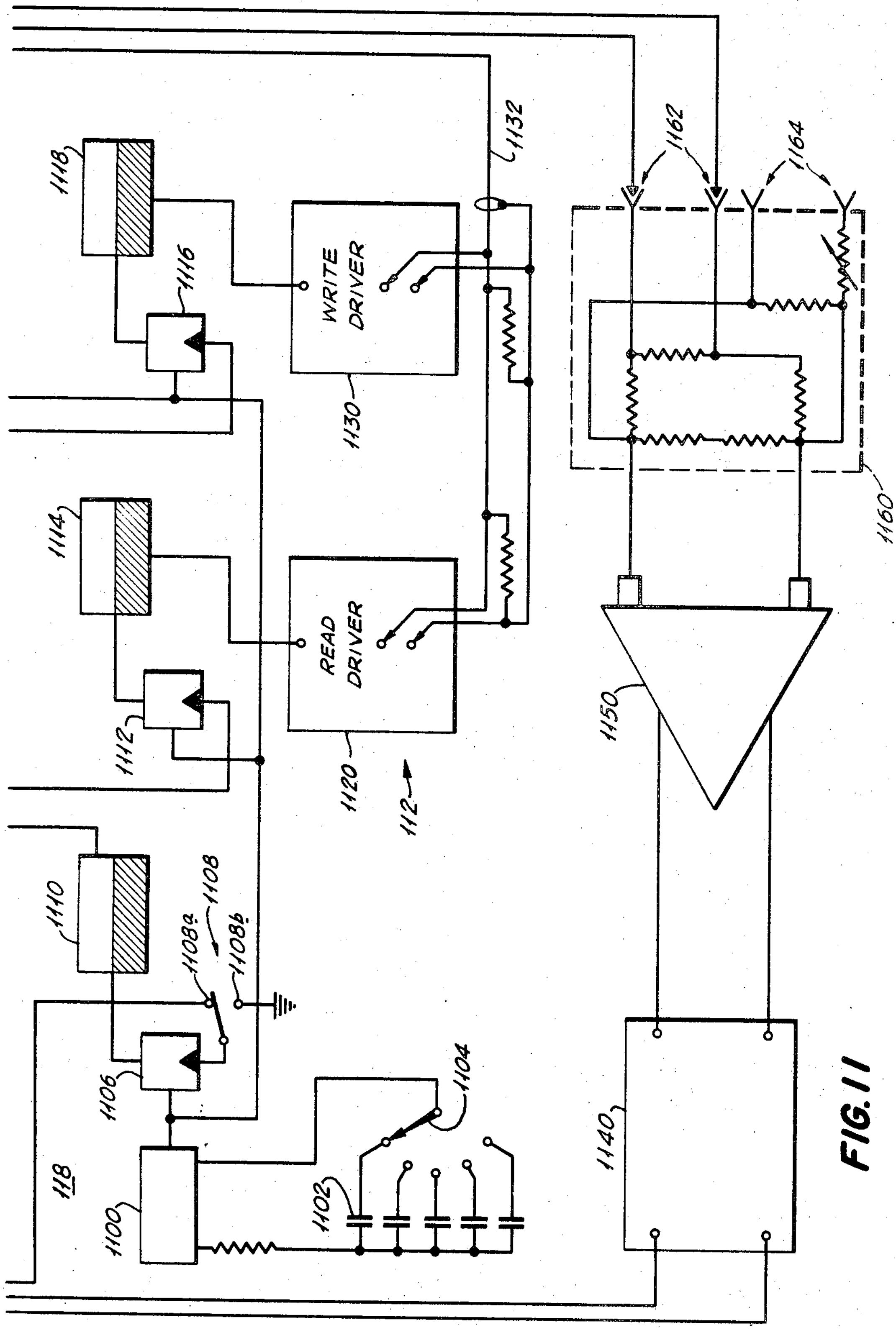

At the end of a core testing operation, the slide 1012 is retracted to a right-hand position and the turntable 1000 is rotated to move the next core 102 to be tested to the position shown in dot-and-dash outline in FIG. 10 in which the upper leg of the core 102 is generally aligned with the opening between the legs of the U-shaped probe assembly. The turntable 1000 pauses or dwells in this position, and the slide 1012 moves to the left so that the core 102 is received between the legs of the U-shaped probe. Continuing movement of the slide 1012 to the left moves the core 102 to the position illustrated in FIG. 10 in which it is disposed adjacent a vertically extending wall of the supporting structure 1014. During this movement, the upper leg of the probe assembly passes outwardly through an opening 1026 in the housing 1014 so that the ends of the conductive elements 1020 and 1022 engage a pair of resiliently biased and opposed contact springs 1028 and 1030, respectively. At the same time, the lower leg of the U-shaped probe assembly passes through an opening 1032 in the housing structure 1014 so that the conductive segments 1020 and 1022 engage a pair of opposed and resiliently biased contact springs 1034 and 1036, respectively. The springs 1030 and 1036 are connected to the core drivers 112 and engage opposite ends of the conductive element 1022 which provides the drive winding. Similarly, the springs 1028 and 1034 are coupled to the detectors 114 and engage opposite ends of the conductive element 1020 which provides the sense winding 108.

After a time delay sufficient to permit the complete cycle of testing operations to be performed on the core 102 at the test station, the timing or cam means driven by the motor 1004 retracts the slide 1012 by movement to the right so that the probe moves out of engagement with the springs 1028, 1030, 1034 and 1036 and out of the openings 1026 and 1032 in the housing or supporting frame 1014. This slide is retracted to the point at which the outer end of the probe assembly is positioned to the right of the core 102 shown in dot-and-dash outline in FIG. 10. When the probe is retracted from a position passing through the center opening 110 of the previously tested core 102, this core is free to be transferred to either an accept receptacle or a reject receptacle under the control of a pair of vacuum lines. A solenoid 1038 controlled by the control circuit 116 controls the setting of a discharge mechanism 1040. This mechanism is normally in a position directing the tested core 102 to a reject receptacle and must be positively operated by the solenoid 1038 under the control of the circuit 116 to a position in which the vacuum line to the reject receptacle is closed and the passage to the accept receptacle is open. Thus, when the probe unit is retracted by the slide 1012, the previously tested core 102 is shifted to the accept receptable only if the solenoid 1038 has been operated to provide a positive indication that the tests on the core 102 have been satisfactorily completed.

With the probe assembly and the slide 1012 in a retracted position, the motor 1004 advances the turntable 1000 to advance the next core 102 to be tested to the position shown in dot-and-dash outline in FIG. 10. The slide 1012 then moves left to transfer the core 102 from the turntable 1000 and to move this core into position in the testing station 1002 and to complete the test windings. The solenoid 1038 is released incident to the resetting of the control circuit 116 at the end of the testing operation.

To provide control signals to the control circuit 116 indicating the feeding of a core 102 from the turntable 1000 to the testing station 1002, a pair of switches 1042 and 1044 are provided. These switches are momentarily operated by a protuberance **1016*a* on the dielectric support for the probe unit during movement of the probe unit to the left as the core 102 is being fed to the testing station 1002. The closure of the contacts 1042 completes an operating circuit for an electrically operated counter 1046 of the mechanical drum type energized from a fullwave rectifier bridge 1048. The momentary closure of the contacts 1042 during only one direction of movement of the slide 1012 operates the counter 1046 so that this counter provides a cumulative total of the number of cores supplied for testing by the system 100. The momentary closure of the contacts 1044 as the slide 1012 is moved to the left during a feeding operation provides a start signal to the control circuit 116**.

As set forth above, the different tests performed on the core 102 at the testing station 1002 take place during different time slots of a single time frame under the control of the program generator 118. The program generator 118 (FIGS. 9 and 11) includes a four stage counting circuit 940 including four flip-flops 941–944 which normally occupy the settings shown in FIG. 9 at the end of a single time frame or cycle of operation. In this position, the flip-flops 941–943 are reset, and the flip-flop 944 is set. The flip-flops 941–944 are coupled together to operate in normal binary counting progression by four inverters 950, 954, 958 and 962, the first three of which are coupled by three pulse transformers 945–947. The counting circuit 940 is driven by a clock pulse source 1100 which provides negative-going pulses to the input of an inverter 1106 at a frequency or repetition rate determined by the selection of one of a plurality of timing capacitors 1102 by a manually adjustable switch 1104. The timing selection circuit of the clock pulse source 1100 can also include a variable resistance element. The inverter 1106 to which the negative-going clock pulses from the source 1100 are applied is selectively controlled to either permit continuous operation of the counting chain 940 or controlled operation in synchronism with the operation of the core handling equipment 104.

More specifically, when a switch 1108 is operated to a position in which a pair of contacts 1108*b* are closed, the inverter 1106 is continuously enabled so that a monostable delay circuit 1110 is set by clock pulses supplied to the inverter 1106 from the source 1100. After a delay interval determined by the setting of the constants for the circuit 1110, this circuit supplies a negative-going pulse to the inverter 950. The delay setting at the monostable circuit 1110 controls the width of each of the time slots in the eight time slot testing frame. This pulse is applied to the complementing inputs of the input flip-flop 941 and is coupled, after a brief delay, through the transformer 945 to the input of the inverter 954. The inverter 954 is selectively rendered effective or ineffective to supply an operating pulse to the flip-flop 942 and the connected pulse transformer 946 in dependence on the set or reset condition of the flip-flop 941. In a similar manner, the inverters 958 and 962 are controlled by pulses received from the transformers 946 and 947 to control the application of operating pulses at the complementing inputs of the flip-flops 943 and 944.

If, however, the counting circuit 940 in the program generator 118 is to be operated in synchronism with the feeding of cores 102 to the testing station 1002, the switch 1108 is operated to a condition in which the contacts 1108*b* are opened and a pair of contacts 1108*a* are closed. This connects the inverter 1106 to the reset output of the fourth flip-flop 944 in the counting circuit 940. In the normal or stop condition of the counting circuit 940, a more negative potential is applied to the inverter 1106 through the closed contacts 1108*a*, and the inverter 1106 cannot respond to input pulses supplied by the clock source 1100. However, when the flip-flop 944 is reset, ground potential is applied to the inverter 1106 through the closed contacts 1108*a*, and the inverter 1106 responds to pulses supplied by the source 1100 until the flip-flop 944 is next operated to its set condition.

The program generator 118 controls the sequential performance of the various testing opeartions on the core 102 under test and thus controls not only the selective enabling of the detectors 114 in different time slots of the testing time frame but also the enabling of the core drivers 112. By selectively changing the sequence by which the detectors 114 and the core drivers 112 are enabled and by selectively supplying different reference potentials to the detectors 114, the system 100 is capable of performing different evaluating operations on the core 102. FIG. 12 of the drawings schematically illustrates one sequence of tests that can be provided by the system 100 and in conjunction with which the detailed operation of this system is described.

In this sequence of tests, the "1" response signal of the core 102, which response signal is shown as a waveform 1200 in FIG. 12, is checked to determine whether its maximum amplitude exceeds a level indicated by a line 1202. Further, the "0" response of the core 102 represented by a waveform 1204 in FIG. 12 is evaluated to insure that it exceeds a minimum limit represented by a line 1206 is less than a value represented by line 1208. In the particular testing sequence for which the system 100 is designed, the program generator 118 provides a testing time frame consisting of eight discrete time slot. To evaluate the "1" response signal of the core 102, a positive-going write signal is applied to this core in the first time slot, and a negative-going read signal is applied in the second time slot. The positive-going write signal is applied again in the third time slot, and the negative-going read signal is again applied in the fourth time slot. A reversal in the remanent flux of the core 102 caused in the fourth time slot by the application of the negatively poled read signal induces a "1" response signal in the sense winding 108, and the program generator 118 includes means for enabling or strobing the "1" evaluating detector in the group of detectors 114 in the fourth time slot. To evaluate the "0" response, the write driver in the group of core drivers 112 is rendered effective in the fifth, sixth, seventh, and eighth time slots to supply positive-going write pulses to the drive winding 106. During the eighth time slot, the "0" evaluating detectors in the group 114 are rendered responsive to the voltage induced in the sense winding 108. This cycle of testing operations is repeated for each core 102 supplied to the testing station 1002.

The plurality of core drivers 112 includes a read driver 1120 (FIG. 11) providing negative-going pulses of 500–800 milliamps and a write driver 1130 providing positive-going pulses of substantially the same amplitude. The outputs of the read driver 1120 and the write driver 1130 are coupled together and to a coaxial cable 1132 extending to the springs 1030 and 1036 engaging the outer conductive segment 1022 of the probe that provides the drive winding 106. The drivers 1120 and 1130 are selectively rendered effective in different time slots of the testing time frame under the control of the counting circuit 940.

To render the read driver 1120 effective in the second and fourth time slots, an enabling or gating input to the driver 1120 is connected to the output of a monostable circuit 1114, the constants of which are set to enable the read driver 1120 for a period of time equal to the desired width of the read pulse. The input of the timing circuit 1114 is connected to the output of an inverter 1112, the input of which is coupled to the output of the clock pulse source 1100. The inverter 1112 is selectively rendered effective in the second and fourth time slots defined by the counting cycle of the counting circuit 940 under the control of an inverter 952 that selectively forwards ground to the inverter 1112.

More specifically, the counting cycle of the circuit 940 is shown in FIG. 13 of the drawings. In the second and fourth time slots, the flip-flop 943 is reset and the input flip-flop 941 is set. The reset condition of the flip-flop 943 supplies ground to the inverter 952 and the set condition of the flip-flop 941 supplies a negative potential to the input of the inverter 952. This places the inverter 952 in a conductive condition so that ground is forwarded to the inverter 1112. Thus, this inverter responds to the clock pulses appearing in the second and fourth time slots supplied by the source 1100. The monostable circuit 1114 permits the width of the read pulse provided by the driver 1120 to be adjusted independently of the width of the clock pulse provided by the source 1100.

To enable the write driver 1130 in the first, third and fifth through eighth time slots, the strobe or gate input of this driver is connected to the output of a monostable timing circuit 1118, the input of which is coupled to the output of an inverter 1116. The input of the inverter 1116 is also connected to the clock pulse source 1100, and the inverter 1116 is selectively supplied with an enabling ground potential under the control of three inverters 956, 960 and 964. The inverter 956 is placed in a conductive condition when the input flip-flop 941 is reset, and the inverter 960 is placed in a conductive condition when the flip-flop 943 is set. If either of these inverters 956 or 960 is in a conductive condition, an enabling ground is applied to the inverter 964. The input of this inverter is supplied with a negative potential whenever the flip-flop 944 is reset. Thus, the inverters 956, 960 and 964 supply an enabling ground to the inverter 1116, either when the flip-flops 941 and 944 are reset or when the flip-flop 943 is set and the flip-flop 944 is reset. As illustrated in the table shown in FIG. 13, the inverter 1116 is enabled in time slots Nos. 1, 3, 5, 6, 7 and 8. Accordingly, the inverter 1116 responds to the clock pulses provided by the source 1100 in these time slots to set the monostable circuit 1118. The constants of the circuit 1118 are set to any desired value to control the duration of the write pulse provided by the driver 1130.

The plurality of detectors 114 includes a "1" evaluating detector 710 and a pair of "0" evaluating detectors 720 and 730 which are coupled to the sense winding 108 and which are selectively enabled in the fourth and eighth time slots to evaluate the "1" and "0" signal responses of the core 102 under test, respectively. To couple the sense winding 108 to the plurality of detectors 114, the inner conductive segment 1020 on the probing assembly engages the springs 1028 and 1034 which are connected to either of a pair of receptacles or sockets 1162 or 1164 at the input to an attenuating network 1160, the output of which is connected to the input of an amplifier 1150. The two pairs of sockets 1162 and 1164 provide means for coupling the amplifier 1150 to different types of test cores 102. The output of the amplifier 1150 is supplied through an attenuating network 1140 which compensates for the different levels of the "0" and "1" response signals and applies a negative-going potential proportional to the "1" response signal to the input of the "1" evaluating detector 710. An amplifier 700 is interposed between the attenuating network 1140 and the inputs of the two "0" evaluating detectors 720 and 730.

To condition the detector 710 for evaluating the maximum amplitude of the "1" response signal shown by the waveform 1200 (FIG. 12), a potentiometer 704 (FIG. 7) energized by a stabilized negative potential source 702 is connected to the reference potential input of this detector 710. The potentiometer 704 is adjusted to a setting corresponding to the level represented by the line 1202 so that the detector 710 is set when the amplitude of the signal represented by the waveform 1200 exceeds the reference level potential. To provide means for selectively strobing or enabling the "1" evaluating detector 710 in only the fourth time slot, the strobe input of this detector is connected to the output of an inverter 906, the input of which is connected to an AND gate including three diodes 908, 910 and 912 selectively connected to the three flip-flops 943, 942, and 941, respectively. The gate including the three diodes 908, 910 and 912 is enabled in the fourth time slot so that the inverter 906 is placed in a nonconductive condition through substantially the entire duration of the fourth time slot to provide a negative-going gate signal to the strobe input of the detector 710. The negative-going signal at the output of the inverter 906 is also forwarded through a diode 904 in a NOR gate to place an inverter 900 in conduction during the fourth time slot. The output of the inverter 900 can be coupled to synchronizing means for a visible display device such as an oscilloscope. Thus, the "1" evaluating detector 710 is enabled in the fourth time slot to determine whether the amplitude of the "1" response signal represented by the waveform 1200 does or does not exceed the minimum level represented by the line 1202.

To provide a visible display of the results of the "1" evaluating test, the set output of the detector 710 is normally connected to the input of a lamp amplifier 711 so that a lamp 712 is normally in a darkened condition. If the detector 710 is set indicating the satisfactory conclusion of the "1" evaluating test, a negative potential is applied to the lamp amplifier 711 to illuminate the lamp 712.

To evaluate the setting of the "1" detector 710, the reset output thereof is connected to the input of an inverter 748 through a diode 746 and a pair of normally closed contacts 740*b* on a switch 740. The inverter 748 is normally maintained in a conductive condition by the detector 710 in its reset condition. However, when the detector 710 is set indicating the satisfactory completion of the "1" evaluating test, the diode 743 is biased in a reverse direction, and the inverter 748 is placed in a nonconductive condition. The detector 710 can be rendered ineffective to control the circuit 116 by operating a switch 740 to open the contacts 740*b* and to close the contacts 740*a*. This applies ground to the cathode of the diode 746 and disconnects the detector 710 from this diode.

To condition the "0" evaluating detectors 720 and 730 for the test program described above, a potentiometer 706 connected to the reference potential input of the detector 720 is adjusted to provide a potential to this detector corresponding to the maximum level shown by the line 1208 (FIG. 12). The detector 730 is conditioned to operate as a minimum level detector by adjusting a potentiometer 708 to supply a negative reference potential to this detector corresponding to the minimum level represented by the line 1206. Thus, in response to completion of the satisfactory "0" evaluation operation, the detector 730 is set, and the detector 720 remains reset.

To enable the detectors 720 and 730 to respond to the "0" response signal provided by the amplifier 700 in only the eighth time slot, the strobe inputs of these two detectors are connected to the outputs of an inverter 920. The input of this inverter is connected to an AND gate including three diodes 914, 916, and 918 which are connected to the flip-flops 943, 942 and 941, respectively. When the counter 940 is in its eighth setting shown in the table in FIG. 13 providing the eighth time slot, the gate including these diodes is enabled, and the inverter 920 is placed in a nonconductive condition to deliver a negative-going pulse for substantially the full duration of the eighth time slot to the strobe inputs of the detectors 720 and 730. This negative-going signal is also forwarded through a second diode 902 in the NOR gate connected to the input of the inverter 900 so that this inverter is placed in a conductive condition during the eighth time slot to synchronize the visual display means.

The selective setting of the "0" evaluating detectors 720 and 730 during testing operations is displayed by a pair of lamps 722 and 732 controlled by a pair of lamp amplifiers 721 and 731, the inputs of which are connected to one set of outputs from the detectors 720 and 730. The lamp amplifiers 721 and 731 are normally in an ineffective condition. However, when either of the detectors 720 or 730 is set, the corresponding amplifiers 721 and 731 is energized to cause the illumination of the connected one of the lamps 722 and 732. Since the detector 720 remains reset and the detector 730 is set during a testing operation resulting in a satisfactory evaluation of the "0" response signal, the lamp 732 is energized at the end of satisfactory testing operations. The illumination of the lamp 722 indicates that the amplitude of the "0" response signal shown by the waveform 1204 exceeded the maximum limit represented by the line 1208.

The settings of the detectors 720 and 730 are checked by means provided in the control circuit 116 for evaluating the satisfactory conclusion of the "0" evaluating test. More specifically, the reset output of the detector 720 is connected through a diode 756 to the input of an inverter 758. The detector 720 normally maintains the inverter 758 in a conductive condition so that an enabling potential is forwarded through a pair of closed contacts 742*b* on a switch 742 to a diode 750 in an AND gate connected to the input of an inverter 754. The reset output of the detector 730 is connected through a pair of normally closed contacts 744*b* on a switch 744 to the cathode of a diode 752 in the AND gate connected to the inverter 754. Since the detector 730 in its reset condition applies a negative potential to the diode 752, the invert 754 is normally in a conductive condition. However, at the conclusion of a satisfactory test on a "0" response signal, the detector 730 is set, and an enabling potential is applied to the diode 752 to permit the inverter 754 to be restored to a nonconductive condition representing the satisfactory completion of the "0" test. Alternatively, if the diode 720 is set indicating excessive maximum amplitude for the "0" response signal, the inverter 758 is placed in a nonconductive condition and applies an inhibiting signal through the diode 750 for maintaining the inverter 754 in a conductive condition. By operating the switches 742 and 744 to their alternate conditions in which the contacts **742*b* and 744*b* are opened and a plurality of pairs of contacts 742*a* and 744*a* are closed, ground is applied to the cathode of the diodes 750 and 752, and these diodes are disconnected from the respective outputs of the detectors 720 and 730**.

When the detectors 114 have been conditioned for operation in the manner described above and the program generator 118 is conditioned for synchronized operation by the closure of the contacts **1108*a*, a power switch 1052 connected to the core handling equipment 1104 is closed to illuminate a pilot lamp 1054 and to supply voltages for operating the core feeder motor 1007 and the drive motor 1004 for the core handling apparatus. The core feeder supplies a sequence of cores 102 to be tested to the turntable 1000. The operation of the motor 1004 rotates the turntable 1000 to advance the first core 102 to be tested to a position aligned with the testing station 1002. At this time, the slide 1012 moves to the left to transfer the first core 102 from the turntable 1000 to the testing station 1002 and to couple this core to both the coupling network 1160 and the outputs of the read driver 1120 and the write driver 1130 over the coaxial cable 1132. Incident to this movement of the slide 1012 and the probe unit carried thereon, the switches 1042 and 1044 are momentarily operated so that the switch 1042 operates the counter 1046 to add an increment of value thereto representing the core 102 now in testing position. The momentary closure of the contacts in the switch 1044 is effective over a circuit including a pair of normally closed contacts 1062*a* on a manual start switch 1062 to control a pulse generator 970. The manual start switch 1062 can be operated to open the contacts 1062*a* and to close a pair of contacts 1062*b* to drive the pulse generator 970 independently of the core handling apparatus 104**.

The pulse generator 970 applies a negative-going pulse over a pair of normally closed contacts **862*b* in a switch 862 to the input of an inverter 860. The inverter 860 provides means for advancing a counter 840 one step in response to each core 102 fed to the testing station 1002. The counter 840 includes four flip-flops 841–844 coupled for series counting operation. Accordingly, when the inverter 860 is placed in a conductive condition, the counter 840 is advanced a single step indicating the feeding of a core 102 to the testing station 1002. A pair of lamps 848 and 854 controlled by a pair of amplifiers 846 and 852 coupled to the flip-flops 841 and 843 visibly indicate the operation of the counter 840**.

The negative pulse provided at the output of the pulse generator 970 is also applied to the input of an inverter 934, the output of which is coupled through an amplifier 932 to the reset leads of the three detectors 710, 720 and 730. Thus, the inverter 934 and the amplifier 932 reset the detectors 710, 720 and 730 to their normal condition in preparation for the following test on the core 102.

The negative-going pulse provided at the output of the generator 970 is also applied to the input of an inverter 974 to place this inverter in a conductive condition. When the inverter 974 is placed in a conductive condition, an inverter 972 is placed in a nonconductive condition. The negative potential provided at the output of the nonconductive inverter 972 is applied to the input of an inverter 976, the other input of which is connected to ground by the flip-flop 944 when the chain 940 is in its reset or stop condition. This places the inverter 976 in a conductive condition to maintain the inverter 972 in a nonconductive state at the end of the pulse from the generator 970. The negative potential provided at the output of the inverter 972 is also applied to the input of an inverter 968 to condition this inverter for conduction. The inverter 968 and an additional inverter 966 provide a NAND gate for operating the counting chain 940 from its reset position to its first setting shown in the table in FIG. 13.

More specifically, when the clock pulse 1100 next supplies a negative-going output pulse, this pulse is applied to the input of the inverter 966 to place this inverter in a conductive condition. When the two inverters 966 and 968 are placed in conduction, a positive-going pulse is applied to a terminal of the flip-flop 944 to operate this flip-flop to a reset condition which starts the generation of the first time slot in the repetitive testing time frame. When the flip-flop 944 is reset, a lamp amplifier 936 terminates the illumination of a lamp 938 to provide a visible indication that the program generator 118 is in operation. In addition, ground potential is forwarded through the closed contacts **1108*a* to render the inverter 1106 responsive to the next output pulse supplied by the clock pulse source 1100. Further, the resetting of the flip-flop 944 removes the enabling ground from the inverter 976 so that both of the inverters 974 and 976 return to a nonconductive condition to place the inverter 972 in a conductive condition. This disables the inverter 968** in the NAND gate.

When the flip-flop 944 is operated to its reset condition to start the first time slot, the inverter 1116 is enabled to set the timing circuit 1118 so that the write driver 1130 applies a positive-going write pulse over the cable 1132 to the probe unit to be applied to the core 102 under test. During the second time slot initiated by the next pulse from the clock pulse source 1100, the counting circuit 940 is advanced to the second setting shown in FIG. 13. The write driver 1130 is now disabled, and the inverter 1112 is enabled to set the timing circuit 1114 so that the read driver 1120 supplies an oppositely poled or negative pulse to the cable 1132 to reverse the direction of the remanent flux in the core 102 under test. In the third time slot, the write driver 1130 is enabled to again reverse the polarity of the remanent flux, and in the fourth time slot, the read driver 1120 is again enabled to reverse the direction of the remanent magnetic field in the core 102 under test. The repeated reversal of the core 102 prior to reading the "1" response provides a more accurate evaluation of the response that the core will provide in actual use.

During the fourth time slot, the gate including the diodes 908, 910, and 912 is enabled by the counting circuit 940, and a negative-going strobe pulse is applied to the gate input of the detector 710 during substantially the entire fourth time slot. If the amplitude of the "1" response produced by the reversal in the direction of the remanent magnetic field in the core 102 represented by the waveform 1200 exceeds the amplitude or level represented by the line 1202, the detector 710 is set so that the lamp amplifier 711 illuminates the lamp 712 to provide a visible indication of the satisfactory results of this test. When the detector 710 is set, a more positive potential is applied to the diode 746, and the inverter 748 is placed in a nonconductive condition so that a negative potential is applied to the input of an inverter 768. This places the inverter 768 in conduction so that energization of a lamp 772 by a lamp amplifier 770 is terminated. When the lamp 772 is placed in a darkened condition, a visible indication is provided that the "1" evaluating test has been satisfactory. The more negative potential at the output of the inverter 748 is also applied to the input of an inverter 760 in a NAND gate to partially enable this gate.

During the fifth, sixth, seventh and eighth time slots, the inverter 1116 sets the timing circuit 1118 so that the write driver 1130 supplies positive-going pulses over the cable 1132 to the drive winding 106 provided by the probe assembly. These pulses drive the core 102 to given field orientation a predetermined number of times and, as with the "1" response, permit the "0" response of the core to be more accurately evaluated. During the eighth time slot, the AND gate connected to the inverter 920 is enabled, and a negative-going gate pulse having substantially the full width of the eighth time slot is applied to the strobe inputs of the detectors 720 and 730 to render these detectors responsive to the "0" response signal shown by the waveform 1204 (FIG. 12). If the "0" response signal falls within the proper limits, i.e., it exceeds the level represented by the line 1206 and does not exceed the amplitude represented by the line 1208, the detector 720 remains reset and the detector 730 is set. The setting of the detector 730 causes the illumination of the lamp 732 and forwards an enabling potential over the closed contacts 744*b* to the diode 752. The diode 750 is enabled from the output of the conductive inverter 758 which remains in a conductive condition because the detector 720 has not been set.

Thus, the inverter 754 is placed in a nonconductive state to apply a more negative potential to the input of an inverter 766. This places the inverter 766 in a conductive condition to terminate the illumination of a lamp 766 by a lamp amplifier 774. With both of the lamps 772 and 776 in a darkened condition, a visible indication is provided that the evaluation of the "1" and "0" response signals has been satisfactory. The negative potential provided at the output of the inverter 754 is also applied to the input of an inverter 762 in the NAND gate with the inverter 760. This places both of the inverters 760 and 762 in conduction so that a ground enabling signal is applied to an inverter 764. The input of this inverter is connected to the output of an inverter 930.

When the clock pulse source 1100 next provides a negative-going output signal, the counting circuit 940 is advanced to its stop or normal position shown in FIG. 13. In this state, the flip-flop 944 is set so that a negative potential is applied through the contacts 1108*a* to the inverter 1106. This inhibits further operation of the counting chain 940 under the control of the clock pulse source 1100. The amplifier 936 is also rendered effective to illuminate the lamp 938 to provide an indication that the program generator 118 has reached the end of a testing time frame and is now in an arrested condition. When the counting circuit 940 reaches its normal or stop condition, four diodes 922, 924, 926 and 928 forming an AND gate connected to the input of an inverter 930 are fully enabled. The inverter 930 is placed in a nonconductive condition to apply a more negative potential to the input of the inverter 764. This places the inverter 764 in a conductive condition so that a monostable delay circuit 800 is set. After a delay interval on the order of seventy milliseconds required to retract the probe assembly and the connected slide 1012, the delay circuit 800 supplies a negative-going pulse to the input of an inverter 802 which sets a second delay circuit 808 having a delay on the order of one hundred and twenty milliseconds.

When the circuit 808 is set, a steady state negative potential is applied to the input of a lamp amplifier 806 to cause the illumination of a lamp 804 which provides a visible indication that both of the "1" and "0" evaluating tests have been satisfactorily completed. This potential is also applied to the input of an inverter 813 which is placed in a conductive condition to control a pair of amplifiers 814 and 824 to energize the windings of a pair of relays 816 and 826. The energization of the relay 816 closes a pair of contacts 816*a* (FIG. 10). The closure of the contacts 816*a* energizes the solenoid 1038 so that the member 1040 is operated to a condition in which the tested core 102 will be discharged to the accept container. The energization of the winding of the relay 826 closes a pair of normally open contacts 826*a* so that a counter 1050 is energized by the fullwave rectifier bridge 1048. The energization of the counter 1050 adds an increment of value to the total standing therein indicating that a tested core 102 has been found to be satisfactory and has been directed to the accept container. Thus, the counter 1046 now indicates that one core has been fed to the testing station 1002 and the counter 1050 indicates that the tested core was found acceptable and directed to the accept receiver.

At the end of the one hundred and twenty millisecond delay interval of the timing circuit 808, this circuit restores to a normal condition to terminate the illumination of the lamp 804 and to release the relays 816 and 826. The timing circuit 808 also supplies a negative-going pulse at the end of this delay period to the input of an inverter 810. The output of this inverter is connected through a pair of normally closed contacts 812*a* on a switch 812 to an amplifier 811. When the inverter 810 is placed in a conductive condition, the amplifier 811 supplies a positive-going reset pulse to the four flip-flops 841, 842, 843 and 844 to reset these flip-flops. Thus, the counter 840 which was advanced a single step under the control of the inverter 860 when the core 102 was fed to the testing station 1002 is now restored to a reset condition in response to the satisfactory conclusion of the testing operation on this core.

During the interval in which the solenoid 1038 is operated to displace the member 1040, the core handling apparatus 104 retracts the probe so that the tested core 102 is deflected to the accept receptacle. The apparatus 104 then rotates the turntable 1000 to advance the next core 102 to the feeding station and advances the probe unit so that this core is transferred to the testing station 1002 and the test windings 106 and 108 are completed. During this movement, the switches 1042 and 1044 are again sequentially operated to initiate the next cycle of testing operation in the system 100 which is performed in the manner described above. The delay of the circuit 808 permits these operations to be performed concurrently with the resetting of the remainder of the system including the detectors 710, 720 and 730 under the control of the pulse source 970 in the manner described above. This is true because the duration of the energization of the relays 816 and 826 under the control of the inverter 813 is independent of continued energization of the timing circuit 808 by the input inverter 802. When the detectors 710, 720 and 730 are reset, the "1" and "0" evaluating components controlled thereby are restored to their normal conditions, and the remainder of the system 100 is conditioned to perform the cycle of testing operations described above.

Assuming that either or both of the "0" and "1" evaluating operations do not reach satisfactory conclusions during the testing of successive cores by the system 100, the NAND gate including the inverters 760 and 762 is not fully enabled, and the delay circuit 808 is not set. Thus, when the probe unit is withdrawn by the slide 1012 at the termination of the testing of each of these cores, the solenoid 1038 is not operated, and the cores 102 are transported by the vacuum line into the reject receiver. Further, since the delay circuit 808 is not set, the inverter 810 does not control the amplifier 811 to reset the counter 840. This permits the counter 840 to advance step-by-step for each core advanced to the testing station 1002 by the core handling apparatus 104.

The counting circuit 840 automatically disables the system 100 when a predetermined number of successive cores have been tested and found to be defective. This is desirable because of the fully automatic nature of the testing operation and the possibility that cores are being rejected because of a malfunction in the system 100 rather than actual defects in the cores. If defects are found to occur at random and not in sequence, the determined defects probably exist in the cores and are not a result of a system failure. In the illustrated system, the outputs of the flip-flops 842, 843 and 844 are connected to an AND gate including three diodes 830, 832 and 834 in such a manner that this gate becomes fully enabled when the counter 840 is advanced to a setting representing twelve successive reject or defective cores. When this AND gate is fully enabled, an inverter 828 is placed in a nonconductive condition so that a negative potential is supplied to a diode 850. This diode is connected to the output side of one of the coupling capacitors in the complementing input to the flip-flop 842, such as the anode of the diode 310 (FIG. 3), and prevents the application of positive-going pulses to this flip-flop that will change its conductive state from that in which the AND gate at the input to the inverter 828 is enabled. Thus, the setting of the counter 840 insofar as the stages 842, 843 and 844 are concerned cannot be changed.

The negative potential provided at the output of the inverter 828 is also forwarded through a diode 858 to place an inverter 856 in a conductive condition. When the inverter 856 is placed in a conductive condition, an amplifier 818 energizes the windings of a pair of relays 820 and 822. The energization of the winding for the relay 820 closes a pair of contacts 820*a* (FIG. 10) to connect the operating winding of an audible annunciator or buzzer 1060 across the input line. This provides an audible indication of the improper operating condition in the system 100. The energization of the winding of the relay 822 closes a pair of contacts 822*a* (FIG. 10) and the opening of a pair of normally closed contacts 822*b*. The closure of the contacts 822*a* causes the illumination of a signal lamp 1056 to provide a visible indication of the improper operating condition and also energizes a solenoid 1058. The solenoid 1058 moves a stop finger (not shown) into the path through which the cores 102 are fed to the turntable 1001 and prevents the feeding of additional cores by the core handling apparatus 104. The opening of the contacts 822*b* interrupts the energizing circuit for the drive motor 1004 for the core handling apparatus 104.

Thus, even though the drive motor 1007 for the core feeding means remains operative, any feeding of the cores is arrested by the finger controlled by the solenoid 1058. The rotation of the turntable 1001 and the reciprocation of the slide 1012 is prevented by the termination of the energization of the drive motor 1004. The ground potential provided at the output of the inverter 856 is also forwarded to one termial of the flip-flop 944 to operate this flip-flop to a condition in which operation of the inverter 1106 is inhibited. This prevents the reinitiation of a cycle of operation of the program generator 118. Accordingly, operation of the system 100 is inhibited in response to the completion of a given number of tests indicating that a predetermined number of successive cores 102 are defective. When the cause of the defective operation has been determined, the operation of the keys 740, 742 and 744 to close the contacts 740*a*, 742*a* and 744*a* places the inverters 748, 754 in a nonconductive condition so that the delay circuit 808 places the inverter 810 in a nonconductive condition to reset the counter 840 to its normal condition. The system 100 can be operated without the control afforded by the counter 840 by operating the switch 862 to open the contacts 862*b* and close the pair of contacts 862*a* which apply continuous ground to the input of the inverter.

The counter 840 can also be used to check the operation of the core handling equipment 104. The evaluating circuits including the inverters 748 and 754 cannot distinguish failures resulting from improper "1" and "0" response potentials from defects arising from a failure of the core handling equipment 104 to feed a core 100 to be tested to the test position 1002. The circuit 840 can be made responsive to the number of times the core handling equipment 104 fails to deliver a core 102 to the station 1002 for testing rather than the number of times in which the "1" and "0" response evaluation on the cores 102 under test is not satisfactory. To change the response of the counting circuit 840, the switch 812 is operated to open the contacts 812*a* and to close the contacts 812*b*. The opening of the contacts 812*a* disconnects the resetting amplifier 811 from the output of the inverter 810 which is operated each time that a core is found to possess satisfactory "1" and "0" response signals. The closure of the contacts 812*b* connects the input of the reset amplifier 811 to the reset output of the detector 730. This detector is set if the "0" response signal has more than a minimum level. Because of the reference potential supplied to the detector 730, this detector will virtually always be set if a core 102 is in the testing station 1002. Accordingly, the failure of the detector 730 to be set, in most instances, provides an indication that a core 102 is not in testing position. Since the detector 730 energizes the amplifier 811 to reset the counter 840, this counter counts the number of occurrences in which the cores 102 are not fed to the testing station 1002 when the switch 812 controlling the resetting of the counter 840 is operated to a position closing the contacts 812*b*. When the counter 840 is operated in this mode, the system 100 is disabled in the manner described above whenever a predetermined number of "no core" conditions have been detected.

Although the present invention has been described with reference to a single illustrative embodiment thereof, it should be understood that numerous other modifications and embodiments can be devised by those skilled in the art that will fall within the spirit and scope of the principles of this invention.

What is claimed and desired to be secured by Letters Patent of the United States is:

1. An apparatus for testing a magnetic element operable to different magnetic states comprising driver means for operating an element under test to a given one of its magnetic states, counting means operable through a cycle of counting operations, means connecting the counting means and the driver means to successively operate the element under test to the given one of its magnetic states a predetermined number of times, detecting means for evaluating the response signal of the element under test in the given one of its magnetic states, inhibiting means coupled to the detecting means for preventing operation of the detecting means, and means controlled by the counting means and coupled to the inhibiting means for disabling the inhibiting means after the element has been successively operated to the given one of its states a given number of times greater than one to render the detecting means responsive to control by the element under test.

2. An apparatus for testing a magnetic element operable to different magnetic states comprising driver means for operating an element under test to a given one of its magnetic states, means controlling the driver means to operate the element under test to the given one of its states a number of times, counting means for counting the number of times that the element under test has been operated to the given one of its states, detecting means for evaluating the response of the element under test, and means controlled by the counting means for rendering the detecting means responsive to control by the element under test only after the element has been operated to the given one of its states a predetermined number of times greater than one.

3. An apparatus for testing a magnetic element operable to different magnetic states comprising driver means to operate the magnetic element under test to its alternate magnetic states a number of times in succession, counting means for providing a count of the number of alternations in the magnetic state of the element under test, detecting means for evaluating the response of the element under test, and means controlled by the counting means for rendering the detecting means responsive to control by the element under test only after the magnetic state of the element under test has been alternated a predetermined number of times greater than one.

4. An apparatus for testing a magnetic element operable to alternate magnetic states comprising first driver means for operating an element under test to one of its magnetic states, second driver means for operating the element under test to its other magnetic state, program means for supplying signals representing discrete time slots in a time frame, first control means controlled by the signals from the program means for controlling the first and second driver means to sequentially operate the element under test to its alternate magnetic states a number of times during a group of the time slots, signal responsive detecting means for evaluating the response signal from the magnetic element under test, and second control means controlled by the signals from the program means for rendering the detecting means responsive to control by the element under test in only a selected one of the group of time slots.

5. An apparatus for testing magnetic elements operable to alternate magnetic states comprising first driver means for applying signals of a first polarity to a magnetic element under test, second driver means for applying signals of a different polarity to the element under test, signal responsive detecting means for evaluating response signals from the element under test, program means providing signals defining discrete time slots in a time frame, first control means controlled by the signals from the program means for rendering the first and second driver means effective to operate the element under test to a given one of its states a plurality of times in a first group of time slots, second control means controlled by the signals from the program means for rendering the detecting means responsive to control by the element under test in a given one of the first group of time slots, said first control means also including means for operating the element under test to the other one of its magnetic states a plurality of times in a second group of time slots, and third means controlled by signals from the program means for rendering the detecting means responsive to control by the element under test in a given one of the second group of time slots.

6. An apparatus for automatically testing magnetic elements comprising a testing station including means for evaluating at least one characteristic of a magnetic element, handling means for feeding magnetic elements in succession to the testing station for evaluation, counting means controlled by the handling means to count the number of elements supplied to the testing station, and means controlled by the testing station for resetting the counting means when the evaluated characteristic of an element under test is satisfactory.

7. An apparatus for testing a magnetic element operable to different magnetic states comprising handling means for feeding magnetic elements in sequence to a testing station, driver means at the testing station selectively operable to operate a magnetic element at the testing station to its different states to produce response signals, detecting means coupled to the element at the testing station for evaluating the response signals, counting means, and means controlled by the detecting means and the handling means for operating the counting means to a setting representing the number of successive magnetic elements fed to the testing station and found to be defective.

8. The apparatus set forth in claim 7 including means controlled by the counting means for rendering the handling means ineffective to feed magnetic elements to the testing station.

9. An apparatus for testing a magnetic element operable to different magnetic states comprising handling means for feeding magnetic elements in sequence to a testing station, driver means at the testing station selectively operable to operate a magnetic element at the testing station to its different states to produce response signals, detecting means coupled to the element at the testing station for evaluating the response signals, output means controlled by the detecting means providing an indication representing the receipt of a satisfactory response signal from the element under test, counting means, means controlled by the handling means for operating the counting means to count the number of magnetic elements supplied to the testing station, and means controlled by the output means for selectively resetting the counting means.

10. An apparatus for automatically testing magnetic elements comprising a testing station including means for placing an element in different magnetic states and evaluating means for evaluating response signals received from the element under test, automatic handling apparatus periodically operable through successive feeding cycles to feed successive elements to be tested to the testing station in a timed sequence, counting means operable to count the number of feeding cycles of the handling means, and means controlled by the evaluating means for resetting the counting means when the element under test is determined to be acceptable so that the counting means indicates the number of successive elements found to be defective.

11. An apparatus for automatically testing magnetic elements comprising a testing station including means for evaluating at least one characteristic of a magnetic element, handling means for feeding magnetic elements in succession to the testing station for evaluation, counting means controlled by the handling means to count the number of elements supplied to the testing station, detecting means for detecting the presence of a magnetic element at the testing station, and means controlled by the detecting means for resetting the counting means.

12. An apparatus for automatically testing magnetic elements comprising a testing station including means for evaluating at least one characteristic of a magnetic element, handling means for automatically feeding magnetic elements in succession to the testing station for evaluation, detecting means for detecting the presence of a magnetic element at the testing station, and means controlled by the detecting means for arresting operation of the handling means when the handling means fails to feed cores to the testing station for a given interval.

13. An apparatus for automatically testing magnetic elements comprising a testing station including means for placing an element in different magnetic states and evaluating means for evaluating response signals received from the element under test, automatic handling apparatus periodically operable through successive feeding cycles to feed successive elements to be tested to the testing station in a timed sequence, detecting means operable incident to each feeding cycle of the handling means for determining the presence or absence of a magnetic element to be tested at the testing station, and means coupled to and controlled by the operation of the detecting means for arresting operation of the apparatus when the handling apparatus fails to feed magnetic elements to the testing station.

14. An apparatus for automatically testing magnetic elements comprising a testing station including means for placing an element in different magnetic states and evaluating means for evaluating response signals received from the element under test, automatic handling apparatus periodically operable through successive feeding cycles to feed successive elements to be tested to the testing station in a timed sequence, counting means operable to count the number of feeding cycles of the handling means, detecting means for determining the presence of a magnetic element to be tested at the testing station incident to the feeding cycle, and means controlled by the detecting means for resetting the counting means when an element is detected at the testing station so that the counting means provides an indication of the total number of successive feeding cycles in which a magnetic element was not supplied to the testing station.

15. An apparatus for automatically testing magnetic elements comprising a testing station including means for placing an element in different magnetic states and evaluating means for evaluating response signals received from the element under test, automatic handling apparatus periodically operable through successive feeding cycles to feed successive elements to be tested to the testing station in a timed sequence, detecting means operable each feeding cycle to determine the presence of an element at the testing station, counting means operable to count the number of feeding cycles of the handling means, resetting means for resetting the counting means, and control means for selectively rendering the evaluating means or the detecting means effective to control the resetting means.

16. An apparatus for testing magnetic elements operable to different magnetic states comprising testing means for operating an element under test to its magnetic states and including evaluating means for evaluating at least one characteristic of the element under test, a signal source for operating the testing means, handling means for automatically feeding successive elements to the testing means in a timed sequence of element feeding operation, and control means operable to a first setting to render the signal source continuously effective to operate the testing means and to a second setting to render the signal source effective to operate the testing means only in a timed relation with the timed sequence of element feeding operations of the handling means.

References Cited

UNITED STATES PATENTS

| | | | |
|---|---|---|---|
| 2,679,025 | 5/1954 | Rajchman et al. | 324—34 |
| 2,760,153 | 8/1956 | Rajchman et al. | 324—34 |
| 2,795,757 | 6/1957 | Wilen | 324—34 |
| 2,796,986 | 6/1957 | Rajchman et al. | 324—34 X |
| 2,922,518 | 1/1960 | Kristensen | 324—34 X |
| 2,934,696 | 4/1960 | Williams et al. | 324—34 |

RUDOLPH V. ROLINEC, *Primary Examiner.*

R. J. CORCORAN, *Assistant Examiner.*